United States Patent
Yamada

[11] Patent Number: 5,923,447
[45] Date of Patent: Jul. 13, 1999

[54] COLOR IMAGE READER

[75] Inventor: Makoto Yamada, Gifu, Japan

[73] Assignee: Brother Kogyo Kabushiki Kaisha, Nagoya, Japan

[21] Appl. No.: 08/762,418

[22] Filed: Dec. 9, 1996

Related U.S. Application Data

[30] Foreign Application Priority Data

Dec. 7, 1995 [JP] Japan .................................. 7-318884

[51] Int. Cl.$^6$ ...................................... G03F 3/08
[52] U.S. Cl. .......................... 358/523; 358/515; 358/529; 382/165
[58] Field of Search ..................... 358/523, 524, 358/515, 518, 529, 504, 500, 501, 505, 527, 514, 509, 516; 382/162, 167, 165; 348/423

[56] References Cited

U.S. PATENT DOCUMENTS

| | | | |
|---|---|---|---|
| 4,879,595 | 11/1989 | Niki et al. .............................. | 358/539 |
| 5,134,666 | 7/1992 | Imao et al. .............................. | 358/462 |
| 5,345,320 | 9/1994 | Hirota ..................... | 358/518 |
| 5,357,354 | 10/1994 | Matsunawa et al. .................... | 382/165 |
| 5,406,366 | 4/1995 | Kusumoto et al. ..................... | 355/327 |
| 5,513,007 | 4/1996 | Ito et al. ................................ | 358/296 |
| 5,701,401 | 12/1997 | Harrington et al. .................... | 358/530 |
| 5,724,440 | 3/1998 | Funada .................................. | 382/162 |

Primary Examiner—Kim Yen Vu
Assistant Examiner—Madeleine An Nguyen
Attorney, Agent, or Firm—Oliff & Berridge, PLC

[57] ABSTRACT

During a black-and-white image reading mode, for each picture element, outputs from at least two of the light receiving elements of the R, G, and B light receiving elements are added together into color sum data. Whether the picture element presents black or white is determined based on the sum data.

22 Claims, 3 Drawing Sheets

COLOR IMAGE READER

BACKGROUND OF THE INVENTION

1. Field of the Invention

The present invention relates to a color image reader capable of reading both a color image and a black-and-white image.

2. Description of the Related Art

There are two types of color image readers: a color image reader provided with a single white color light source; and a color image reader provided with three light sources for respectively emitting red (R), green (G), and blue (B) color lights. The color image reader with the single white color light source will be referred to simply as "white light image reader" hereinafter. The color image reader with the three light sources will be referred to simply as "three light image reader" hereinafter.

The white light image reader has three color sensors: a red light sensor for detecting a red light component, a green light sensor for detecting a green light component, and a blue light sensor for detecting a blue light component. The three light sensors are constructed from three CCD sensors, each covered with a corresponding color filter. The three color sensors are assembled into a single CCD device. It is noted that the green light sensor has a higher sensitivity, and the blue light sensor has a lower sensitivity. On the other hand, the three light image reader has a single monochromatic sensor covered with no color filter.

Each type of the image readers can read both color images and black-and-white images. When reading a color image, each image reader is controlled to produce R, G, and B signals indicative of red, green, and blue color components of each picture element of the image. When reading a black-and-white image, on the other hand, each image reader is controlled to produce black-white signals BW indicative of whether each picture element presents black or white. It is noted that each image reader can read a color image as a black-and-white image. That is, the image reader can be controlled to read the color image and to produce black-white signals BW indicative of a black-and-white image for reproducing the color image with only black and white colors.

When reading a black-and-white image with the white light image reader, the image reader is controlled to drive the green light sensor to read out the original because the green light sensor has the higher sensitivity. The image reader reads out the black-and-white image at a speed corresponding to the amount of outputs obtainable by the green light sensor. Because the green light sensor can detect red color as black, the green light sensor can also read a color original image as a black-and-white image.

When desiring to read out a black-and-white image with the three light image reader, on the other hand, the image reader is controlled to turn on all the red, green, and blue light sources. The monochromatic sensor is controlled to read out the image with the light from all the three light sources. Accordingly, the monochromatic sensor can produce outputs with amounts almost three times as large as the amounts of outputs obtained by the white light image reader. The three light image reader can therefore read out the image within a shorter period of time.

SUMMARY OF THE INVENTION

The three light image reader is, however, expensive because the image reader is mounted with the three light sources and also with drive circuits for simultaneously driving the three light sources.

It is therefore desirable to further increase the reading speed of the white light image reader which can be produced less costly than the three light image reader. It is noted, however, that the sensitivity of the green light sensor is only as two times as high as the sensitivity of the blue light sensor. Accordingly, it is difficult to further increase the reading speed of the white light image reader.

It is therefore, an object of the present invention to overcome the above-described drawbacks, and to provide an improved color image reader which can be produced less costly and which can still read a black-and-white image within a shorter period of time.

In order to attain these and other objects, the present invention provides a color image reading apparatus capable of reading both a color image and a black-and-white image, comprising: original reception means capable of receiving both a color image original and a black-and-white image original; a light source for emitting a light to an original received on the original reception means; R, G, and B light receiving elements for receiving red, green, and blue color components of light which have been reflected at the original, the R, G, and B light receiving elements outputting signals indicative of red, green, and blue color components of an image of the original; adding means capable of adding signals outputted from at least two of the R, G, and B light receiving elements for each picture element of the original image when reading the original as a black-and-white image original; and black-white judging means capable of judging whether each picture element of the original image presents either one of black and white based on an added result outputted from the adding means.

Preferably, the adding means may add the signals outputted from all the R, G, and B light receiving elements for each picture element when the original is a black-and-white image original. The adding means may preferably subtract a black level from each of the signals outputted from the R, G, and B light receiving elements before adding them.

The color image reading apparatus may further comprise designation means for designating either one of a color image reading mode and a black-and-white image reading mode, the color image reading mode being for reading the original on the original reception means as a color image, the black-and-white image reading mode being for reading the original on the original reception means as a black-and-white image. The color image reading apparatus may further comprise black-and-white image process control means for controlling, when the designation means designates the black-and-white image reading mode, the adding means to add the signals outputted from the at least two of the R, G, and B light receiving elements for each picture element and the black-white judging means to judge whether the each picture element presents black or white based on the added result.

According to another aspect, the present invention provides a color image reading apparatus capable of reading both a color image and a black-and-white image, comprising: a single white light source; a photoelectric conversion means provided with R, G, and B light receiving elements for receiving red, green, and blue color components of light which have been emitted from the white light source and which has been reflected at an original, the R, G, and B light receiving elements outputting signals indicative of the red, green, and blue color components of the original image; adding means for adding signals outputted from at least two of the R, G, and B light receiving elements for each picture element during a black-and-white image reading process; and black-white judging means for judging whether the each picture element presents either one of black and white based on an added result outputted from the adding means.

According to still another aspect, the present invention provides a method of reading an image as a black-and-white image, the method comprising the steps of: irradiating an original with a white light; controlling R, G, and B light receiving elements to receive red, green, and blue color components of the white light reflected from the original and to output R, G, and B signals indicative of the red, green, and blue color components of the original; adding the signals outputted from at least two of the R, G, and B light receiving elements for each picture element of the original; and judging whether each picture element presents either one of black and white based on an added result, thereby producing an output signal indicative of the judged result.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF PREFERRED EMBODIMENT

A facsimile machine according to a preferred embodiment of the present invention will be described while referring to the accompanying drawings wherein like parts are designated by the same reference numerals to avoid duplicating description.

Figure 1:
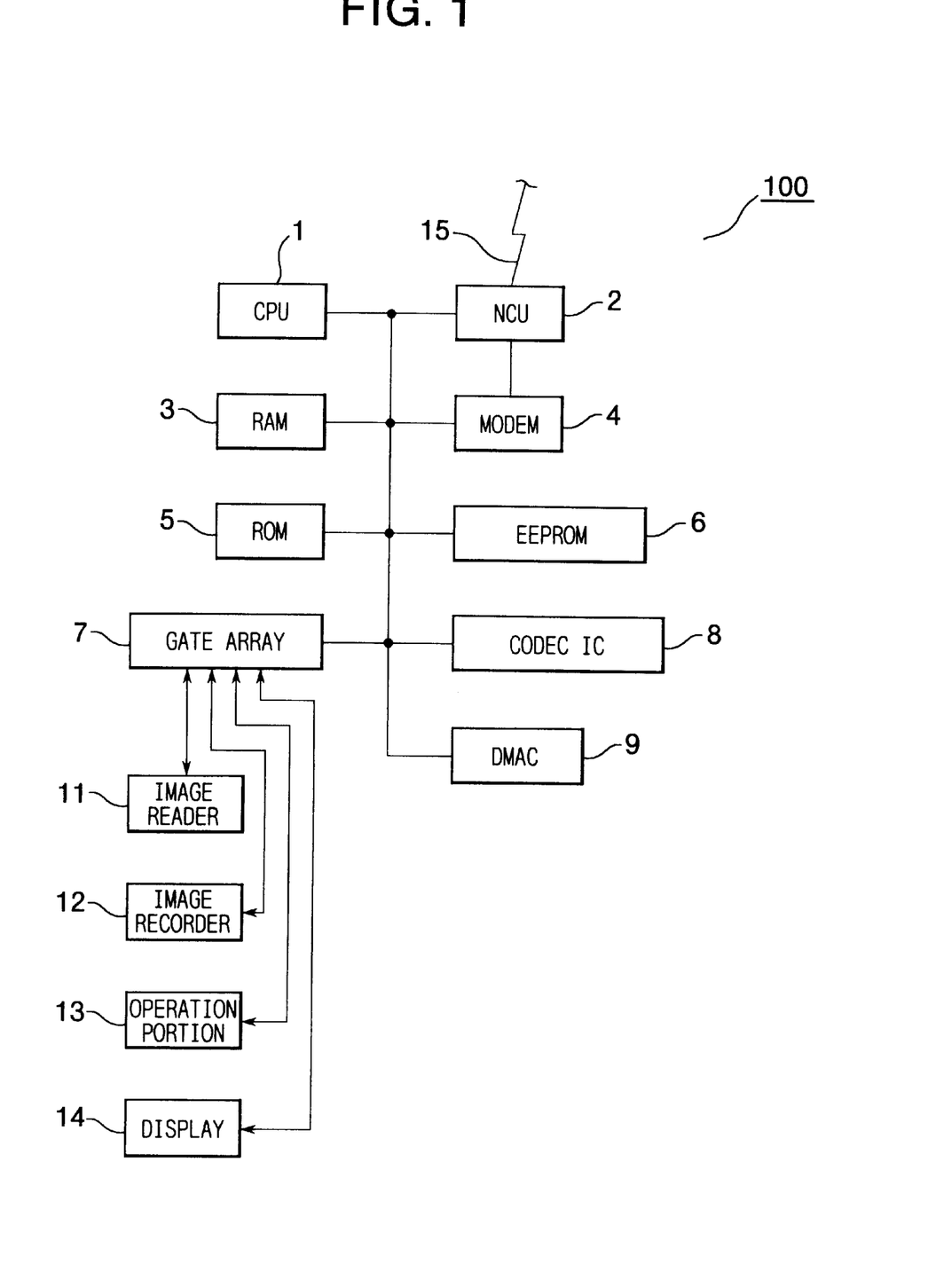
FIG. 1 is a circuit block diagram of a facsimile machine of a preferred embodiment of the present invention.

FIG. 1 is a circuit block diagram of the facsimile machine 100 of the present embodiment. The facsimile machine 100 has an image reading portion 11, to which applied is the color image reading apparatus of the present invention.

As shown in FIG. 1, the facsimile machine 100 includes: a central processing unit (CPU) 1, a network control unit (NCU) 2, a random access memory (RAM) 3, a modem 4, a read only memory (ROM) 5, an electrically erasable programmable ROM (EEPROM) 6, a gate array 7, a codec IC 8, and a direct memory access controller (DMAC) 9 which are connected with one another via a bus line. The modem 4 and the NCU 2 are connected with each other. The NCU 2 is connected to a telephone line 15.

The gate array 7 is connected to the image reading portion 11, an image recording portion 12, an operation portion 13, and a display portion 14.

The NCU 2 is for being connected with the telephone line 15 and for controlling the telephone network. The modem 4 is for modulating data to be transmitted to a remote facsimile machine (receiver) and for demodulating data transmitted from a remote facsimile machine (transmitter). The codec IC 8 is for decoding data received from the transmitter and for encoding data to be transmitted to the receiver.

The ROM 5 previously stores therein several programs such as a color image reading mode program for performing a color image reading operation and a black-and-white image reading mode program for performing a black-and-white image reading operation.

The EEPROM 6 is for storing various flag data and registration data. The EEPROM 6 also stores therein black level data $V_{BL}$, white level data $V_w$, and threshold data $V_s$ as will be described later.

The RAM 3 is for storing various data. For example, the RAM 3 temporarily stores therein R data, G data, and B data indicative of original color images produced by the image reading portion 11. Especially, during the black-and-white image reading mode, the RAM 3 further temporarily stores therein black-white data BW calculated by the CPU 1 based on the R data, G data, and B data.

The gate array 7 serves as an input/output interface for the CPU 1. For example, the gate array 7 quantizes the R signals, G signals, and B signals supplied from the image reading portion 11 into R data, G data, and B data with using the white level data $V_w$, and transfers those data to the RAM 3. For example, the gate array 7 quantizes the value of each of the R, G, and B signals into either one of density values 0 to 255, and outputs the quantized value as corresponding data (R, G, or B data.) The gate array 7 also serves to convert the R, G, and B data into C, M, and Y data before transferring the C, M, Y data to the image recording portion 12.

The DMAC 9 is for controlling to write data in and to retrieve data from the RAM 3.

The image recording portion 12 is capable of recording images (monochromatic color images and full color images) onto sheets of papers. The image recording portion 12 may be constructed from various types of printer such as an ink jet color printer and a thermal sublimation type copy color printer.

The operation portion 13 is comprised of a plurality of key switches. A user manipulates the operation portion 13, whereupon the operation portion 13 outputs several instruction signals corresponding to the user's manipulation. For example, the user can manipulate the operation portion 13 to select either one of the color image reading mode and the black-and-white image reading mode. The user can further manipulate the operation portion 13 so as to be capable of performing a facsimile transmission operation and a copying operation.

The display portion 14 is comprised of a liquid crystal display (LCD) and is controlled by the CPU 1 to display various instructions.

The image reading portion 11 is capable of reading both color original images and black-and-white original images. The image reading portion 11 produces a red (R) signal, a green (G) signal, and a blue (B) signal for each picture element of an original image. The R, G, and B signals are quantized into R, G, and B data by the gate array 7 before being temporarily stored in the RAM 3.

During the color image reading mode, thus obtained R, G, and B data are used as image data indicative of color state of each picture element of the original image. During the black-and-white image reading mode, on the other hand, the R, G, and B data are added together into color sum data S indicative of black-white degree of the corresponding picture element. Black-white data BW is produced based on the color sum data S, and is used as image data indicative of whether the corresponding picture element presents black or white.

The CPU 1 is for controlling the entire facsimile machine 100. For example, the CPU 1 performs a facsimile reception operation through controlling the NCU 2, the modem 4, and the codec IC 8 to receive data transmitted from a remote facsimile machine via the telephone line 15 and controlling the image recording portion 12 to output a hard copy of the received data. When the user manipulates the operation portion 13 to designate a facsimile transmission operation, the CPU 1 also performs a facsimile transmission operation through controlling the image reading portion 11 to read out an original thereby producing image data, and controlling the codec IC 8, the modem 4, and the NCU 2 to transmit the image data to a remote facsimile machine via the telephone line 15. When the user manipulates the operation portion 13 to designate a copying operation, the CPU 1 performs a copying operation through controlling the image reading portion 11 to read out an original thereby producing image data and to control the image recording portion 12 to produce a hard copy of the produced image data.

It is noted that the image reading portion 11 performs a color image reading operation when the user designates the color image reading mode while designating the facsimile transmission operation or the copying operation. In this case, the CPU 1 controls the gate array 7 to quantize, into R, G, and B data, R, G, and B signals outputted from the image reading portion 11 and to supply the R, G, and B data to the CPU 1. When receiving the R, G, and B data, the CPU 1 subtracts the black level data $V_{BL}$ from the R, G, and B data. The CPU 1 then inputs the black level-subtracted R, G, and B data into the RAM 3. The R, G, and B data are temporarily stored in the RAM 3. Then, R, G, and B data, which have been obtained from the same picture element of the original image, are simultaneously retrieved from the RAM 3 as an RGB data set (image data) indicative of the corresponding picture element. Thus, the CPU 1 produces image data indicative of a color state of each picture element of the original.

When the above-described color image reading operation is performed during the facsimile transmission operation, the CPU 1 transfers the thus produced image data (RGB data set) to the codec IC 8, where the image data is encoded. The CPU 1 then controls the modem 4 and the NCU 2 to transmit the encoded data to the remote facsimile machine. When the above-described color image reading operation is performed during the copying operation, on the other hand, the CPU 1 further controls the gate array 7 to convert the image data (RGB data set) into CMY data. The CPU 1 transfers the CMY data to the image recording portion 12 where the CMY data is recorded.

The image reading portion 11 performs a black-and-white image reading operation when the user designates the black-and-white image reading mode while designating the facsimile transmission operation or the copying operation. Also in this case, the CPU 1 controls the gate array 7 to quantize, into R, G, and B data, R, G, and B signals outputted from the image reading portion 11 and to supply the R, G, and B data to the CPU 1. When receiving the R, G, and B data, the CPU 1 subtracts the black level data $V_{BL}$ from the R, G, and B data. The CPU 1 then inputs the black level-subtracted R, G, and B data into the RAM 3. The R, G, and B data are temporarily stored in the RAM 3. Then, R, G, and B data, which have been obtained from the same picture element of the original image, are simultaneously retrieved from the RAM 3, and are added together into color sum data S. The CPU 1 further compares the color sum data S with the predetermined threshold data $V_s$, thereby producing black-white data BW (image data) indicative of whether the corresponding picture element presents black or white. Thus, the CPU 1 produces image data indicative of each picture element of the original black-and-white image.

When the above-described black-and-white image reading operation is performed during the facsimile transmission operation, the CPU 1 transfers the thus produced image data (black-white data BW) to the codec IC 8, where the image data is encoded. The CPU 1 then controls the modem 4 and the NCU 2 to transmit the encoded data to the remote facsimile machine. When the above-described black-and-white image reading operation is performed during the copying operation, on the other hand, the CPU 1 further controls the gate array 7 to convert the image data (black-white data BW) into CMY data. The CPU 1 transfers the CMY data to the image recording portion 12 where the CMY data is recorded. It is noted that when the image recording portion 12 is constructed to record images not only with cyan, magenta, and yellow ink but also with black ink, the CPU 1 does not control the gate array 7 to convert the black-white data BW into CMY data. The CPU 1 directly transfers the black-white data BW to the image recording portion 12 as K data. The image recording portion 12 records black-and-white images based on the received K data.

The image reading portion 11 will be described below in greater detail below.

Figure 2:
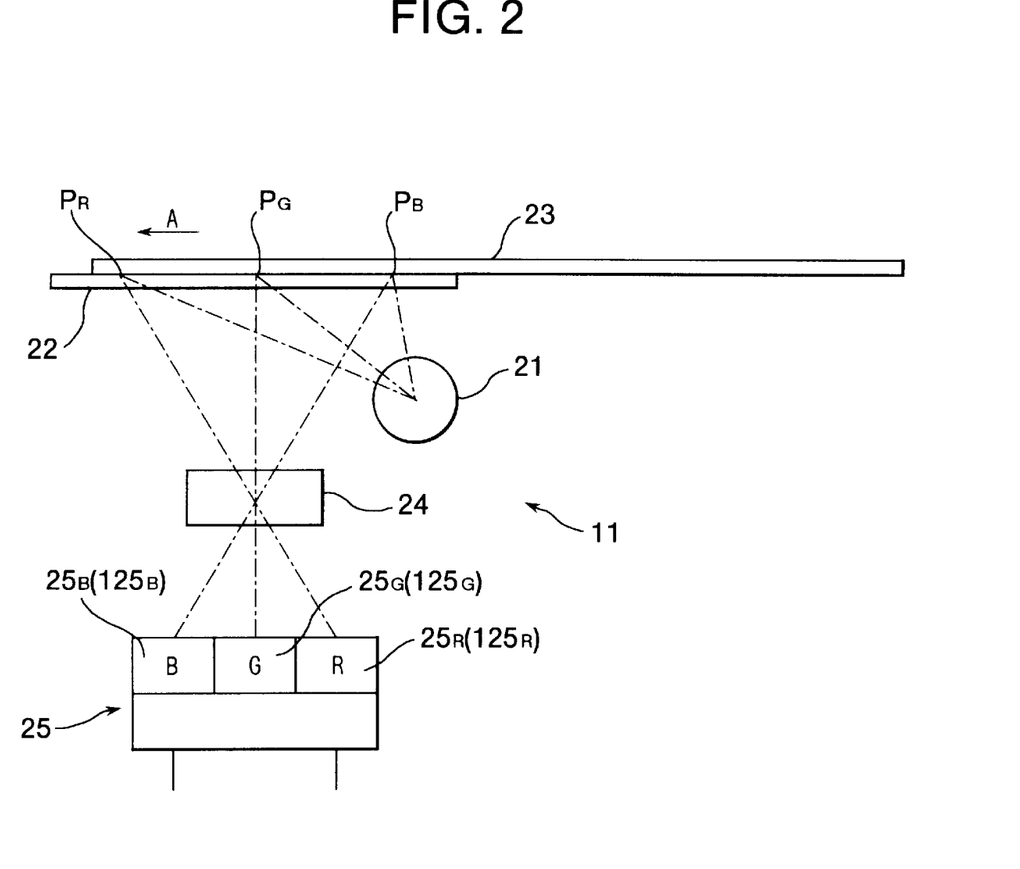
FIG. 2 illustrates an essential part of an image reading portion in the facsimile machine of FIG. 1.

As shown in FIG. 2, in the image reading portion 11, a single white light source 21 is located below a transparent glass platen (original stand) 22. An original 23, mounted on the glass platen 22, is transported by a sheet feed motor (not shown in the drawing) in a sheet feed direction A. The sheet feed motor successively transports the original 23 by one line's worth of distance along the sheet feed direction A. The white light source 21 has an elongated shape extending along the direction perpendicular to the original feed direction A. The white light source 21 has a length corresponding to a width of the original 23. When activated, the white light source 21 emits white light to the original 23. The white light reflects off the original 23.

A lens 24 is located so that the light reflected at the original 23 will pass through the lens 24. A color CCD 25 is located below the lens 24. The color CCD 25 has three light reception arrays 25R, 25G, and 25B. The color CCD 25 is located so that the light having passed through the lens 24 will fall incident on the light reception arrays 25R, 25G, and 25B. The light reception arrays 25R, 25G, and 25B are arranged parallel to the original feed direction A.

Each of the light reception arrays (25R, 25G, or 25B) is comprised of a predetermined number "L" of light receiving elements (125R, 125G, or 125B) which are arranged in the direction perpendicular to the original feed direction A. The number "L" of the light receiving elements (125R, 125G, or 125B) on each light reception array (25R, 25G, or 25B) corresponds to the width of the original 23 and to the length of the white light source 21. The light receiving elements 125R have a sensitivity peak for red light. The light receiving elements 125R therefore produce R (red) signals indicative of red components of the image on the original 23. The light receiving elements 125G have a sensitivity peak for green light. The light receiving elements 125G therefore produce G (green) signals indicative of green components of the image on the original 23. The light receiving elements 125B in the light reception array 25B have a sensitivity peak for blue light. The light receiving elements 125B therefore produce B (blue) signals indicative of blue components of the image on the original 23.

As shown in FIG. 2, the white light source 21 emits white light entirely over the glass platen 22. The glass platen 22 has three fixed reading line positions PR, PG, and PB along the sheet feeding direction A. Each of the reading line positions PR, PG, and PB extends perpendicularly to the sheet feeding direction A. The reading line positions PR, PG, and PB are separated from one another by a certain amount of distance. The light reception array 25R is located so as to be capable of receiving only a part of the white light that has reflected off a part of the original 23 that is located on the reading line position PR. The light reception array 25G is located so as to be capable of receiving only another part of the white light that has reflected off a part of the original 23 that is located at the reading line position PG. The light reception array 25B is located so as to be capable of receiving only still another part of the white light that has reflected off a part of the original 23 that is located at the reading line position PB.

Accordingly, the R, G, and B signals simultaneously outputted from the light reception arrays 25R, 25G, and 25B are indicative of color states of different lines on the original 23. In view of this, according to the present embodiment, the R, G, and B signals are temporarily stored in the RAM 3 after being quantized by the gate array 7 into R, G, and B data. Then, R, G, and B data, which have been originated from the same line, are simultaneously retrieved from the RAM 3, whereby RGB data sets are obtained for all the picture elements on the corresponding line of the original 23.

It is now assumed that the reading line positions PB and PG are separated by a hundred line's worth of distance, and that the reading line positions PG and PR are separated also by a hundred line's worth of distance. In this case, when the light reception array 25B reads a certain line, i.e., n-th line (where n is an integer $\geq 0$) of the original 23 and produces B signals for that line, the light reception array 25G produces G signals for a (n-100)-th line of the original 23, and the light reception array 25R produces R signals for a (n-200)-th line of the original 23.

For example, when a leading line (0-th line) of the original 23 reaches the reading line position PB, any other lines of the original 23 do not yet reach other reading line positions PG or PR. At that moment, the light receiving elements 125B on the light reception array 25B produce B signals indicative of the blue color components of the 0-th line of the original 23. The light receiving elements 125R and 125G on the light reception arrays 25R and 25G, on the other hand, produce R and B signals indicative of color states of an original holder cover (not shown) provided over the glass platen 22. These R and G signals are also stored in the RAM 3 as well as the B signals for the 0-th line supplied from the light reception array 25B.

Thus, each of the light reception arrays 25R, 25G, and 25B performs a line reading operation repeatedly K (=M+200) times to produce K lines' worth of signals, where M is a total number of lines on the original 23 to be read. For example, in order to read out the original 23 of an A4 size at a reading density of 300 dpi, each of the light reception arrays 25R, 25G, and 25B is controlled to produce 3,531 lines' worth of signals in total when the distances between the reading line positions PB and PG and between the reading line positions PG and PR are both 1 millimeter.

Figure 3:
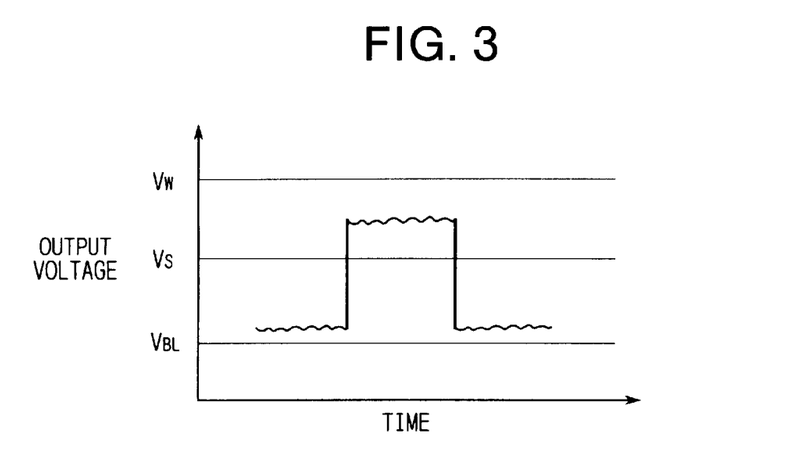
FIG. 3 illustrates an output waveform of each light reception element in a color CCD provided to the image reading portion.

As shown in FIG. 3, each of the R, G, and B signals outputted from the light receiving elements 125R, 125G, and 125B includes a direct current component of a fixed black level $V_{BL}$. That is, each of the R, G, and B signals includes the black level $V_{BL}$ regardless of whether the white light source 21 is turned on and turned off and regardless of a color state of the original 23.

In view of this, according to the present embodiment, the EEPROM 6 previously stores therein data of the black level $V_{BL}$. The black level $V_{BL}$ is determined as an amount of a signal outputted from each light receiving element 125R, 125G, and 125B when the white light source 21 is turned off.

It is noted that the EEPROM 6 also previously stores therein the white level data $V_w$. The white level data $V_w$ is determined as an amount of a signal outputted from each light receiving element 125R, 125G, and 125B when a completely white original 23 is mounted on the glass platen 22.

It is further noted that the EEPROM 6 also previously stores therein threshold data $V_s$. As shown in FIG. 3, the threshold data $V_s$ has an intermediate level between the white level data $V_w$ and the black level data $V_{BL}$.

As described already, the CPU 1 subtracts the black level $V_{BL}$ from each of the R, G, and B data before the R, G, and B data are stored in the RAM 3. Thus black level-subtracted R, G, and B data will be used as data indicative of a corresponding color state of the original 23. The black level-subtracted R, G, and B data will enhance a signal-to-noise ratio.

During the color image reading operation, the thus black level-subtracted R, G, and B data, which have been originated from the same picture element, are simultaneously retrieved from the RAM 3 and are used as a set of RGB image data indicative of a color state of that picture element.

According to the present invention, when the original 23 has a black-and-white image constructed only from white and black colors, the user manipulates the operation portion 13 to designate the black-and-white image reading mode, whereby the black-and-white image reading operation starts. It is noted that the user can designate the black-and-white image reading mode also when the original 23 has a color image. The user designates the black-and-white image reading mode when he/she desires to obtain black-white data BW which is indicative of a black-and-white image for reproducing the color original image with black and white colors.

Figure 4:
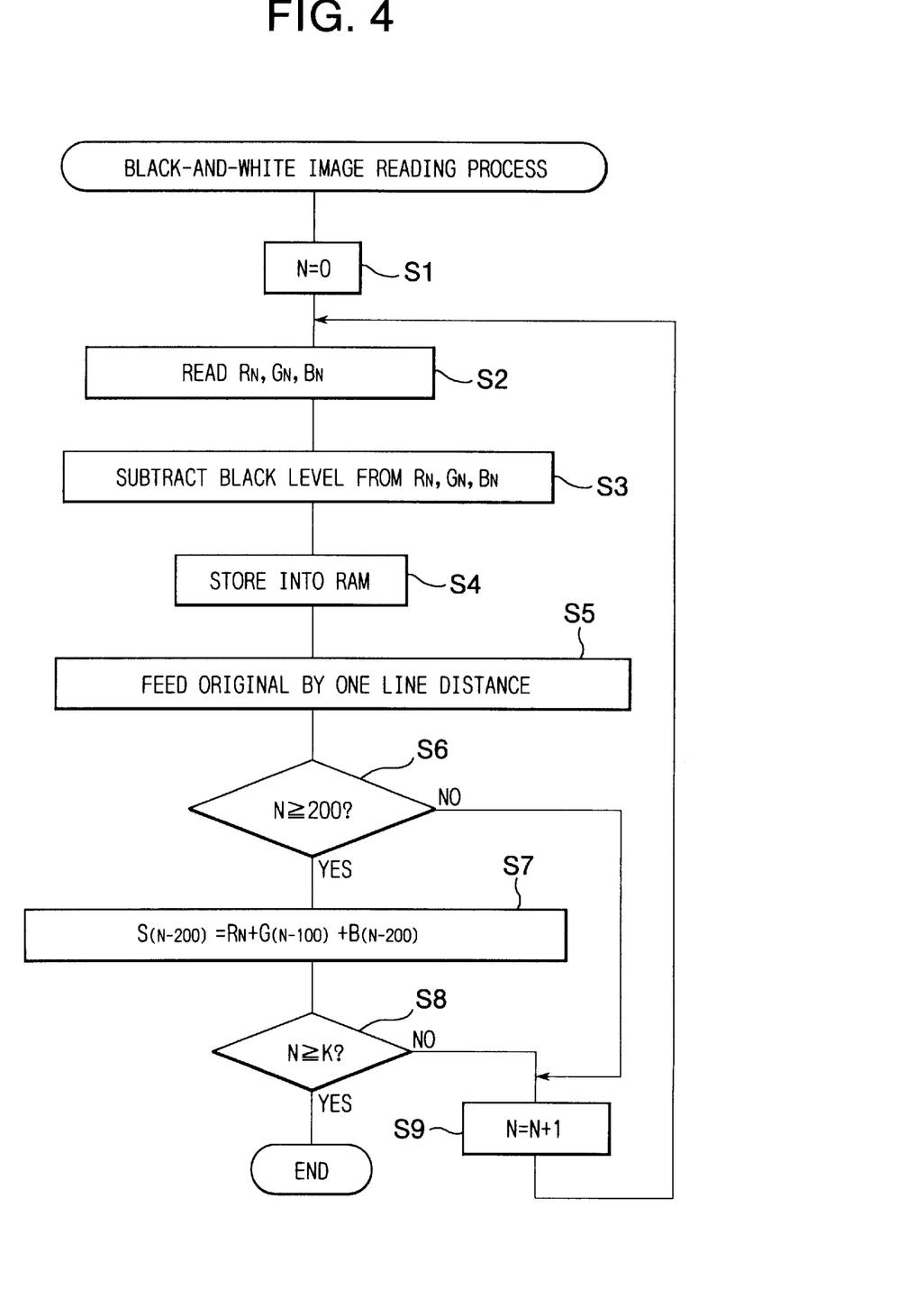
FIG. 4 is a flowchart of a black-white original reading process performed by the facsimile machine of FIG. 1.

The black-and-white image reading process will be described below in greater detail with reference to FIG. 4. This black-and-white image reading process starts when the user mounts an original 23 on the glass platen 22 and then manipulates the operation portion 13 to designate the black-and-white image reading mode.

During this mode, first, in S1, an initialization setting is performed to set a variable N to zero (0). Then, the original feed motor (not shown) is actuated to transport the original 23 to such an initial position that the 0-th line of the original 23, which is positioned at the leading edge of the original 23, confronts the reading line position PB.

According to the present embodiment, the color CCD 25 is controlled to perform a line-reading operation repeatedly the number of K times in total. That is, the light reception arrays 25R, 25G, and 25B are controlled to simultaneously perform line-reading operations the number of K times. In the example where the reading line positions PB, PG, and PR are separated from one another by a hundred lines' worth of distances, the number K is equal to (M+200) where M is the total number of lines to be read from the original 23.

The variable N will indicate a N-th line-reading operation achieved by the light reception arrays 25R, 25G, and 25B. During the N-th line-reading operation, the light reception array 25B reads out a line presently located on the reading line position PB, and produces B signals $B_N$. The light reception array 25G reads out a line presently located on the reading line position PG, and produces G signals $G_N$. The light reception array 25R reads out a line presently located on the reading line position PR, and produces R signals $R_N$.

In more concrete terms, during the N-th line-reading operation, the light receiving elements 125B produce blue signals $B_N$ indicative of the line of the original 23 located on the reading line position PB. The light reception array 25B therefore outputs "L" number of signals $B_N$ where "L" is the number of the light receiving elements 125R. The light receiving elements 125G produce green signals $G_N$ indicative of a line of the original 23 located on the reading line position PG. The light reception array 25G therefore outputs "L" number of signals $G_N$ where "L" is the number of the light receiving elements 125G. The light receiving elements 125R produce red signals $R_N$ indicative of the line of the original 23 located on the reading line position PR. The light reception array 25R therefore outputs "L" number of signals $R_N$ where "L" is the number of the light receiving elements 125G.

In this example, the light reception array 25B reads out a N-th line of the original during the N-th line-reading operation. For example, the light reception array 25B reads out the 0-th line of the original 23 during a 0-th line-reading operation which is performed immediately after the initialization step of S1. The light reception array 25G reads out a (N-100)-th line during the N-th line-reading operation. For example, the light reception array 25G reads out the 0-th line of the original 23 during a 100-th line-reading operation. In other words, the light reception array 25G reads out the 0-th line of the original 23 after the original 23 has been fed by the 100 lines' worth of distance from the initial position. Accordingly, G signals $G_0$–$G_{99}$, which are produced by the light reception array 25G during the 0-th to 99-th line-reading operations, provide no information on the original 23. The G signals $G_0$–$G_{99}$ provide information on the color state of the original holder cover (not shown) provided over the glass platen 22.

The light reception array 25R reads out a (N-200)-th line during the N-th line-reading operation. For example, the light reception array 25R reads out the 0-th line of the original 23 during a 200-th line-reading operation. In other words, the light reception array 25R reads out the 0-th line of the original 23 after the original 23 has been fed by the 200 lines' worth of distance from the initial position. Accordingly, R signals $R_0$–$R_{199}$, which are produced by the light reception array 25R during the 0-th to 199-th line-reading operations, provide no information on the original 23. The R signals $R_0$–$R_{199}$ provide information on the color state of the original holder cover.

Then, in S2, the CPU 1 controls the light receiving elements 125R, 125G, and 125B of the light reception arrays 25R, 25G, and 25B to perform the N-th line-reading operation and to produce signals $R_N$, $G_N$, and $B_N$, respectively. In this step, the CPU 1 also controls the DMAC 9 to retrieve the signals $R_N$, $G_N$, and $B_N$ from the light receiving elements 125R, 125G, and 125B. The CPU 1 further controls the gate array 7 to quantize the signals $R_N$, $G_N$, and $B_N$ into quantized data $G_N$, and $B_N$ and to transfer the quantized data $R_N$, $G_N$, and $B_N$ to the CPU 1.

In S3, the CPU 1 refers to the black level $V_{BL}$ stored in the EEPROM 6. The CPU 1 then subtracts the black level $V_{BL}$ from each of the data $R_N$, $G_N$, and $B_N$. In S4, the CPU 1 controls the DMAC 9 to input the black level-subtracted data $R_N$, $G_N$, and $B_N$ into the RAM 3.

Next, in S5, the CPU 1 controls the original feed motor by one line's worth of distance in the original feed direction A. In S6, the CPU 1 judges whether or not the variable N is presently equal to or higher than 200.

When the variable N is equal to or higher than 200 (Yes in S6), the program proceeds to S7. In S7, the CPU 1 retrieves three sets of data $R_N$, $G_{(N-100)}$, and $B_{(N-200)}$ from the RAM 3. The set of data $R_N$ includes "L" number of data $R_N$ which have been obtained from the light reception array 25R during the N-th line-reading operation. The set of data $G_{(N-100)}$ includes "L" number of data $G_{(N-100)}$ which have been obtained from the light reception array 25G during the (N-100)-th line-reading operation. The set of data $B_{(N-200)}$ includes "L" number of data $B_{(N-200)}$ which have been obtained from the light reception array 25B during the (N-200)-th line-reading operation. These sets of data $R_N$, $G_{(N-100)}$, and $B_{(N-200)}$ are therefore originated from the same line, i.e., (N-200)-th line on the original 23.

The CPU 1 then adds a value of data $R_N$, which has been outputted from each light receiving element 125R, with a value of data $G_{(N-100)}$, which has been outputted from a corresponding light receiving element 125G, and a value of data $B_{(N-200)}$, which has been outputted from a corresponding light receiving element 125B. In other words, the CPU 1 adds values of data $R_N$, $G_{(N-100)}$, and $B_{(N-200)}$ for each picture element of the (N-200)-th line through the following formula (1), thereby producing color sum data $S_{(N-200)}$:

$$S_{(N-200)} = R_N + G_{(N-100)} + B_{(N-200)} \quad (1)$$

The color sum data $S_{(N-200)}$ is therefore indicative of a black-white degree of a corresponding picture element on the (N-200)-th line of the original 23. The CPU 1 produces color sum data $S_{(N-200)}$ for all the picture elements on the (N-200)-th line. Thus, the CPU 1 produces a set of color sum data $S_{(N-200)}$ for the (N-200)-th line.

For example, when N=200, $S_0 = R_{200} + G_{100} + B_0$. That is, the CPU 1 retrieves a set of data $R_{200}$ which has been produced by the light reception array 25R during the 200-th line-reading operation. The CPU 1 retrieves a set of data $G_{100}$ which has been produced by the light reception array 25G during the 100-th line-reading operation. The CPU 1 retrieves a set of data $B_0$ which has been produced by the light reception array 25B at the 0-th line-reading operation. All the sets of data $R_{200}$, $G_{100}$, and $B_0$ are therefore obtained from the 0-th line (leading line) of the original 23. The CPU 1 adds those data together into a set of color sum data $S_0$ which is indicative of a black-white degree of the 0-th line.

In S7, the CPU 1 further compares the color sum data $S_{(N-200)}$ of each picture element on the (N-200)-th line with the predetermined threshold level $V_s$ which is shown in FIG. 3. When the color sum data $S_0$ is equal to or higher than the threshold level $V_s$, the CPU 1 determines that the corresponding picture element is white. The CPU 1 therefore produces black-white data BW indicating that the corresponding picture element is white. When the color sum data $S_0$ is lower than the threshold level $V_s$, on the other hand, the CPU 1 determines that the corresponding picture element is black. The CPU 1 therefore produces black-white data BW indicating that the corresponding picture element is black. The CPU 1 thus produces image data BW indicative of the determined color (black or white), and then inputs the produced image data in the RAM 3.

Then, in S8, the CPU 1 judges whether or not the variable N reaches the total reading number K. When the variable N reaches the number K (yes in S8), the black-and-white image reading process is completed.

When the variable N does not yet reach the total reading number K (no in S8), on the other hand, the CPU 1 adds one (1) to the variable N in S9, and the program returns to S2. Then, the next line-reading operation is performed.

Thus, the black-white data calculation operation of S7 is performed for the (N-200)-th line (200 ≤ N ≤ K) of the original 23 directly after a N-th line-reading operation is performed in S2. Thus, the color sum data S is successively produced for the respective lines of the original 23. Thus, image data (black-white data BW) is produced for the successive lines of the original 23.

It is noted that while the variable N does not reach 200 (no in S6), the program proceeds directly to S9 because data $R_0$ to $R_{199}$ or $G_0$ to $G_{99}$ do not supply any information on the original 23. The black-white data calculation operation is achieved only after all the data $R_{200}$, $G_{100}$, and $B_0$ are obtained for the 0-th original line. Accordingly, R data obtained during the 0-th through 199-th line-reading operations and G data during the 0-th through 99-th line-reading operations are merely stored in the RAM 3, but are not used.

As described above, according to the black-and-white image reading process of the present invention, R, G, and B data produced by the light reception elements 125R, 125G, and 125B for each picture element are added together into color sum data S. The thus obtained color sum data S is compared with the threshold level $V_s$. Based on the compared result, black-white data BW is obtained for each picture element. Even though the image reading portion 11 is provided with only the single white light source 21, the image reading portion 11 can obtain an output S with its amount being three times as high as an output obtained by the conventional white light image reader. Because the output of the image reading portion 11 has an amount proportional to the period of time during which the color CCD 25 receives light, increasing the speed, at which the original 23 is transported in the original feeding direction A, will decrease the amount of the output produced from the color CCD 25. Even when the reading speed is increased three times as high as the conventional white light image reader, however, the color CCD 25 can still output signals of the same amounts as those obtained in the conventional white light image reader. Accordingly, the black-white data BW can be calculated with a non-degraded accuracy. The image reading portion 11, provided with the single white light source 21, can be produced less costly in comparison with the conventional three light image reader.

Additionally, the black level $V_{BL}$ is subtracted from R, G, and B data outputted from the light reception arrays 25R, 25G, and 25B before the data are added together into the color sum data S. Accordingly, the black level $V_{BL}$ is not included three times in the color sum data S. The color sum output S has therefore a high signal-to-noise ratio.

While the invention has been described in detail with reference to the specific embodiment thereof, it would be apparent to those skilled in the art that various changes and modifications may be made therein without departing from the spirit of the invention.

For example, according to the present embodiment, all the outputs from the light reception arrays 25R, 25G, and 25B are added together into the color sum data S for each picture element. However, it may be possible to add outputs from at least two of the light reception arrays 25R, 25G, and 25B into the color sum data S for each picture element. Still in this case, it is possible to enhance the reading speed in comparison with the case where the color sum output is determined based on an output from only one of the light reception arrays 25R, 25G, and 25B as in the conventional white light image reader.

In the above-described embodiment, the RAM 3 stores all the outputs $R_0$–$R_{199}$ which are produced by the light reception arrays 25R while the lead line (0-th line) of the original 23 does not reach the read line position PR. The RAM 3 stores all the outputs $G_0$–$G_{99}$ which are produced by the light reception array 25G while the lead line (0-th line) of the original 23 does not reach the read line position PG. However, the CPU 1 may input to the RAM 3 only data $R_{200}$, $R_{201}$, . . . of the light reception array 25R which are produced after the lead line of the original 23 reaches the read line position PR. Similarly, the CPU 1 may input to the RAM 3 only data $G_{100}$, $G_{101}$, . . . of the light reception array 25G which are produced after the lead line of the original 23 reaches the read line position PG. In this case, the CPU 1 may input the data $R_N$ (N≧200), $G_N$ (N≧100), and $B_N$ (N≧0) from the light reception arrays 25R, 25G, and 25B into different regions in the RAM 3. The CPU 1 may simultaneously retrieve the R, G, and B data from the corresponding regions from their leading end portions, thereby automatically retrieving data $R_N$, $G_{(N-100)}$, and $B_{(N-200)}$ for the same (N-200)-th line of the original 23 simultaneously.

The embodiment is directed to the facsimile machine 100 with the image reading portion 11 being constructed from the color image reading apparatus of the present invention. However, the color image reading apparatus of the present invention can be applied to other various devices such as a color copy machine.

As described above, the color image reading apparatus of the present invention is capable of reading both a color image and a black-and-white image. The apparatus is provided with the single light source. The photoelectric conversion device is provided with R, G, and B light receiving elements for receiving red, green, and blue color components of light which has been emitted from the light source and which has been reflected at the original. According to the present invention, signals for each picture element outputted from at least two of the R, G, and B light reception elements are added together during a black-and-white image reading process. Whether each picture element presents black or white is determined based on the added result.

Because the color image reading apparatus is provided with the single light source, the image reading apparatus can be produced less costly. Because the outputs from at least two light receiving elements are added together into read output data, the read output data may have a sufficiently large amount. It is possible to increase the reading speed during the black-and-white image reading process.

According to the embodiment, the signals for each picture element produced by all the R, G, and B light reception elements are added together into the read output data. Accordingly, the read output data has a larger amount. It is possible to further increase the reading speed.

A black level (direct current component) is subtracted from each of the signals outputted from the R, G, and B light reception elements before the signals are added together into the read output data. It is therefore possible to prevent the direct current components of the R, G, and B light receiving elements from being added together to be included in the read output data. The read output data has a high signal-to-noise ratio.

What is claimed is:

1. A color image reading apparatus capable of reading both a color image and a black-and-white image, comprising:

original reception means capable of receiving both a color image original and a black-and-white image original;

a light source for emitting a light to an original received on the original reception means;

R, G, and B light receiving elements for receiving red, green, and blue color components of light which have been reflected at the original, the R, G, and B light receiving elements outputting signals indicative of red, green, and blue color components of an image of the original;

adding means capable of adding signals outputted from at least two of the R, G, and B light receiving elements for each picture element of the original image when reading the original as a black-and-white image original; and black-white judging means capable of judging whether each picture element of the original image presents either one of black and white based on an added result outputted from the adding means.

2. A color image reading apparatus as claimed in claim 1, wherein the adding means adds the signals outputted from all the R, G, and B light receiving elements for each picture element when reading the original as a black-and-white image original.

3. A color image reading apparatus as claimed in claim 1, wherein the adding means subtracts a black level from each of the signals outputted from the R, G, and B light receiving elements before adding them.

4. A color image reading apparatus as claimed in claim 1, wherein the black-white judging means compares the added result with a predetermined threshold value, thereby judging whether the corresponding picture element presents black or white.

5. A color image reading apparatus as claimed in claim 1, further comprising designation means for designating either one of a color image reading mode and a black-and-white image reading mode, the color image reading mode being for reading the original on the original reception means as a color image, the black-and-white image reading mode being for reading the original on the original reception means as a black-and-white image.

6. A color image reading apparatus as claimed in claim 5, further comprising black-and-white image process control means for controlling, when the designation means designates the black-and-white image reading mode, the adding means to add the signals outputted from the at least two of the R, G, and B light receiving elements for each picture element and the black-white judging means to judge whether the each picture element presents black or white based on the added result.

7. A color image reading apparatus as claimed in claim 6, wherein the R, G, and B light receiving elements are arranged relative to the original on the original reception means so as to be capable of simultaneously receiving red, green, and blue color components of light which have been reflected at different picture elements of the original, the R, G, and B light receiving elements outputting R, G, and B signals indicative of the red, green, and blue color components of the different picture elements, further comprising:

signal storage means for temporarily storing the signals outputted from the R, G, and B light reception means; and signal retrieval means for retrieving the R, G, and B signals produced by the R, G, and B light receiving elements for each picture element and for supplying the retrieved R, G, and B signals to the adding means.

8. A color image reading apparatus as claimed in claim 7, wherein the signal retrieval means quantizes the R, G, and B signals before transferring the signals to the adding means.

9. A color image reading apparatus as claimed in claim 8, wherein the adding means subtracts a black level from each of the quantized R, G, and B signals supplied from the signal retrieval means.

10. A color image reading apparatus as claimed in claim 9, wherein the black-white judging means compares the added result with a predetermined threshold value, thereby judging whether the corresponding picture element presents either one of black and white.

11. A color image reading apparatus as claimed in claim 10, wherein the black-white judging means produces image data indicative of whether each picture element of the original presents either one of black and white.

12. A color image reading apparatus as claimed in claim 11, further comprising color image process control means for controlling, when the designation means designates that the color image reading mode, the signal storage means to temporarily store the signals outputted from the R, G, and B light reception means and the signal retrieval means to retrieve the R, G, and B signals produced by the R, G, and B light receiving elements for each picture element and to output a set of the retrieved R, G, and B signals as color image data indicative of a color state of each picture element.

13. A color image reading apparatus as claimed in claim 12, wherein the color image process control means controls the signal retrieval means to quantize the R, G, and B signals after retrieving the R, G, and B signals.

14. A color image reading apparatus as claimed in claim 13, wherein the color image process control means subtracts a black level from each of the quantized R, G, and B signals supplied from the signal retrieval means before outputting the quantized R, G, and B signals as the color image data.

15. A color image reading apparatus capable of reading both a color image and a black-and-white image, comprising:

a single white light source;

photoelectric conversion means provided with R, G, and B light receiving elements for receiving red, green, and blue color components of light which have been emitted from the white light source and which have been reflected at an original, the R, G, and B light receiving elements outputting signals indicative of the red, green, and blue color components of the original image;

adding means for adding signals outputted from at least two of the R, G, and B light receiving elements for each picture element during a black-and-white image reading process; and black-white judging means for judging whether the each picture element presents either one of black and white based on an added result outputted from the adding means.

16. A color image reading apparatus as claimed in claim 15, wherein the adding means adds the signals outputted from all the R, G, and B light receiving elements for each picture element during the black-white original reading process.

17. A color image reading apparatus as claimed in claim 16, wherein the adding means subtracts a black level from each of the signals outputted from the R, G, and B light receiving elements before adding them.

18. A method of reading an image as a black-and-white image, the method comprising the steps of:

irradiating an original with a white light;

controlling R, G, and B light receiving elements to receive red, green, and blue color components of the white light reflected from the original and to output R, G, and B signals indicative of the red, green, and blue color components of the original;

adding the signals outputted from at least two of the R, G, and B light receiving elements for each picture element of the original; and judging whether each picture element presents either one of black and white based on an added result, thereby producing an output signal indicative of the judged result.

19. A method as claimed in claim 18, wherein the signals outputted from all the R, G, and B light receiving elements for each picture element are added.

20. A method as claimed in claim 18, wherein a black level is subtracted from each of the signals outputted from the R, G, and B light receiving elements for each picture element before the signals are added.

21. A color image reading apparatus as claimed in claim 1, wherein the R, G, and B light receiving elements are arranged relative to the original on the original reception means so as to be capable of simultaneously receiving red, green, and blue color components of light which have been reflected at different picture elements of the original, the R, G, and B light receiving elements outputting R, G, and B signals indicative of the red, green, and blue color components of the different picture elements, further comprising:

signal storage means for temporarily storing the signals outputted from the R, G, and B light reception means; and     signal retrieval means for retrieving at least two of the R, G, and B signals produced by the R, G, and B light receiving elements for each picture element and for supplying the retrieved at least two of the R, G, and B signals to the adding means.

22. A method as claimed in claim 18, wherein the R, G, and B light receiving elements are arranged relative to the original so as to be capable of simultaneously receiving red, green, and blue color components of light which has been reflected at different picture elements of the original, the R, G, and B light receiving elements being controlled to output R, G, and B signals indicative of the red, green, and blue color components of the different picture elements, and wherein the adding step includes the steps of:

temporarily storing the signals outputted from the R, G, and B light receiving elements; and     retrieving at least two of the R, G, and B signals produced by the R, G, and B light receiving elements for each picture element to be added together.

\* \* \* \* \*